United States Patent [19]
Barber

[11] 3,869,181
[45] Mar. 4, 1975

[54] RESILIENT MULTIPLE ELEMENT BEARING SEAL

[75] Inventor: Richard H. Barber, Valparaiso, Ind.

[73] Assignee: McGill Manufacturing Company, Inc., Valparaiso, Ind.

[22] Filed: Apr. 16, 1973

[21] Appl. No.: 351,432

Related U.S. Application Data

[63] Continuation-in-part of Ser. No. 194,641, Nov. 1, 1974, Pat. No. 3,748,003.

[52] U.S. Cl. .............................. 308/187.2, 277/94
[51] Int. Cl. ..... F16c 33/78, F16c 33/80, F16j 15/34
[58] Field of Search ........ 308/187.2, 187.1; 277/58, 277/94, 65

[56] References Cited
UNITED STATES PATENTS

| | | | |
|---|---|---|---|
| 2,914,365 | 11/1959 | Spicacci | 308/187.2 |
| 3,090,628 | 5/1963 | Guilietti | 308/187.2 |
| 3,361,497 | 1/1968 | Stengel | 308/187.2 |
| 3,396,977 | 8/1968 | Iguchi | 308/187.2 |
| 3,449,029 | 6/1969 | Smith | 308/187.2 |
| 3,642,335 | 2/1972 | Takahashi | 277/94 |
| 3,748,003 | 7/1973 | Barber | 308/187.2 |

Primary Examiner—M. Henson Wood, Jr.
Assistant Examiner—Howard Beltran
Attorney, Agent, or Firm—Meuller, Aichele & Ptak

[57] ABSTRACT

A multiple element bearing seal in which a first annular ring of resilient nonmetallic material is positioned in oppositely disposed grooves in the inner and outer racerings of the bearing assembly. The first annular ring has a radial face defined by an outer peripheral edge and an inner annular edge and an integral extension extending outwardly divergent to the radial face. The integral extension is in a running contact fit with one of the inner and outer racerings and applies pressure to the first annular ring to maintain it in a running contact fit with the racering grooves. A second annular sealing ring of resilient nonmetallic material has an edge positioned in one of the grooves. The outer edge extends axially outwardly of the bearing assembly and rests on the corner face of the other racering in a contact seal.

3 Claims, 4 Drawing Figures

RESILIENT MULTIPLE ELEMENT BEARING SEAL

CROSS-REFERENCE TO RELATED APPLICATION

This application is a continuation-in-part of application Ser. No. 194,641, filed Nov. 1, 1971 now U.S. Pat. No. 3,748,003, issue July 24, 1973, and assigned to the assignee of this application.

BACKGROUND OF THE INVENTION

This invention relates generally to resilient nonmetallic seal rings for bearing assemblies, and more particularly to such a seal providing a multiple contact with moving parts in an anti-friction bearing assembly and adapted to keep moisture and foreign matter out of the bearing raceway.

The sealing of lubricant holding spaces between the inner and outer racerings in bearing assemblies to prevent the introduction of foreign material therein is a continuing problem. In many industrial applications where there is a possibility of only slight contamination getting into the anti-friction bearing elements, a seal having a single element contact with a bearing ring will retain the lubricant within the bearing and exclude foreign particles such as dirt so that the bearing operates satisfactorily during its normal life. In heavy duty applications, however, where the bearings are constantly exposed to dirt, moisture, chemicals and the like, a single sealing element has been found to be unsatisfactory and is usually replaced with a multi-element seal.

Thus, it has been common to have multi-element seals which were contained in a groove in either the inner or outer race-ring of the bearing with the uncontained ends of the seal elements dragging on the surface of the other race in a running contact seal therewith. In such a situation, tolerances were generally critical between the outer and inner racerings in order to limit seal "drag" on the bearing races to a useful amount. These close tolerances and the need for a better finish to reduce the drag necessitates grinding the mating surfaces of the racerings and generally adds to production costs. In many instances this seal "drag" has resulted in bearing failure.

In still another example of a multiple element seal, the sealing elements were positioned in the bearing raceways in such a manner which prevented relubrication of the bearing in an operating assembly without literally blowing the seals from the bearing.

Additionally, attempts within the bearing industry to use nylon and other nonmetallic materials as the sealing elements have resulted in space saving and cost savings as compared to other sealing materials. However, the nonmetallic sealing materials are pressure sensitive and, if mounted without external support, will not maintain a tight or pressed fit with an associated steel bearing member. Therefore, after a period of time in an operating installation a tightly fitted nonmetallic sealing member which is combined in a groove in one racering and permitted to drag on the other racering within close tolerances will become loose and allow the entrance of foreign materials into the bearing raceway.

SUMMARY OF THE INVENTION

It is one object of this invention to provide an improved multiple element seal for an anti-friction bearing assembly that extends bearing life.

It is another object of this invention to provide a multiple element bearing seal which permits relubrication of the lubricant holding space of the bearing.

It is still another object of this invention to provide a multiple element bearing seal which permits relubrication of the lubricant holding space of the bearing and which provides a tight seal in a running contact fit with the bearing rings.

It is a further object of this invention to provide an improved multi-element seal which permits the desired relatively unimpaired motion between the inner and outer bearing raceways.

In one embodiment of this invention, a bearing assembly has an inner member and an outer member which are relatively rotatable and which are spaced apart for receiving anti-friction elements and lubricant therebetween. Each of the members has an annular groove in a corresponding outboard axial end thereof, which grooves are oppositely disposed from one another. A seal for sealing the space between the members to prevent the introduction of foreign matter into the lubricant holding space includes first and second annular sealing rings of a resilient nonmetallic material each having an outer peripheral edge and an inner annular edge defining a radial body portion. The first annular sealing ring is positioned in the bearing assembly with the outer peripheral edge fitting into the annular groove in the outer member and the inner annular edge fitting into the annular groove in the inner member, with the radial body portion of the ring extending across the space between the members. The first annular sealing ring includes a portion extending axially outwardly from its outboard radial face which portion rides in an interference fit on one of the inner and outer members and applies pressure to the radial body portion of the ring to maintain a running contact seal between it and the wall of the groove. The second annular sealing ring is positioned in the bearing assembly with one of the outer peripheral and inner annular edges being fit into the annular groove in a selected one of the inner and outer members with the first sealing ring, and the other of the edges extending axially outwardly of the bearing assembly with the radial body portion extending across the space between the members and impinging against a corner face of the nonselected member in a running contact seal therewith.

A further embodiment of this invention comprises a first annular sealing ring having an inner annular edge and an outer peripheral edge defining a radial body portion with a resilient integrally molded extension extending axially outwardly from the outboard radial face of the body portion. The outer peripheral edge of the sealing ring is retained in a seal retaining groove in the outer racering, with the extension riding on the outer racering in an interference fit and resiliently compressing the radial body portion into the groove to form a running contact seal therewith.

The first sealing ring may include a vent whereby with increased internal pressure in the lubricant holding space between the inner and outer members during the relubrication operation the vent permits the lubricant to bleed past the first annular sealing ring. The lubricant bleeding past the first annular sealing ring forces the integral resilient extension away from contact with the racering, and the lubricant bleeding past this extended body portion forces the radial body portion of the second sealing ring away from contact with the corner face of the nonselected member to permit the lubricant to escape from the bearing assembly thereby relieving the internal pressure in the lubricant holding space and preventing the seals from being blown from the bearing assembly.

DETAILED DESCRIPTION

Figure 1:
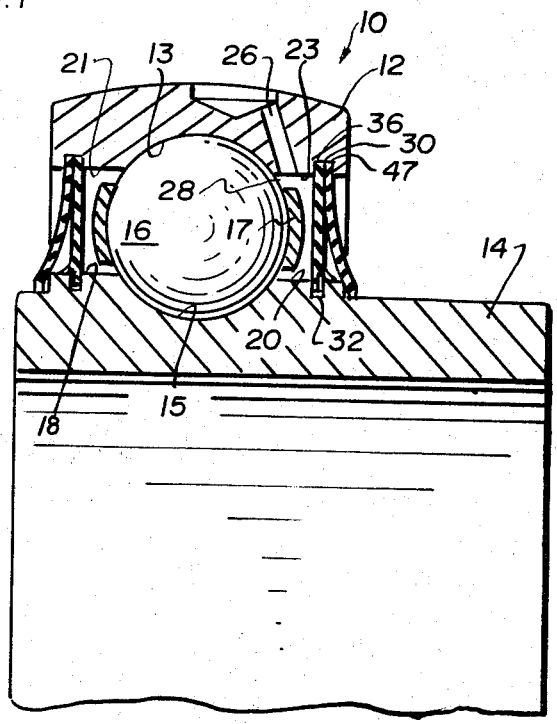
FIG. 1 is a cross-sectional view of the bearing assembly and seal structure in accordance with this invention.
Figure 2:
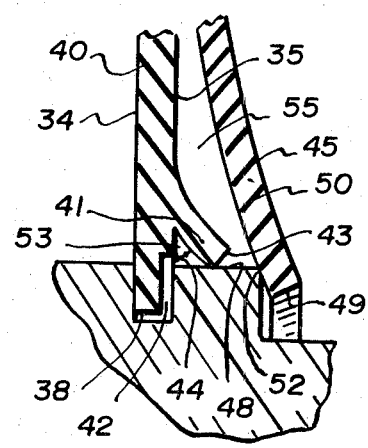
FIG. 2 is an expanded cross-sectional view of a portion of the seal structure of the bearing assembly of FIG. 1.

Referring to the drawings, FIGS. 1 and 2 show a bearing assembly 10 which includes an outer member or racering 12 and an inner member or racering 14 which are rotatable relative to one another. The outer racering 12 has a ball track 13 and the inner racering 14 has a ball track 15. The racerings 12 and 14 have a common axis and form a raceway in the bearing tracks 13 and 15 between the respective outer and inner faces thereof. A series of anti-friction members or balls 16 are positioned in the raceway by separator 17. It should be understood that while a ball bearing is shown the seal could be applicable with other types of bearings. Inner land portions 18 and 20 on the inner racering 14 and a corresponding outer land portions 21 and 23 on the outer racering 12 restrict the axial movement of the balls 16. A lubricating duct 26 is provided to introduce lubricant into the lubricant holding space 28 between the inner and outer racerings.

First and second radially extending grooves 30 and 32 are oppositely disposed from one another in the outer and inner racerings respectively. Because the sealing elements in each axial end of the bearing assembly 10 are identical, it should be clear that the description pertains equally to the seal at the opposite axial end or to those bearing assemblies where only one axial end of the structure is sealed.

In accordance with this invention, a first annular sealing ring 34 of a resilient nonmetallic material such as nylon having an outer peripheral edge 36 and an inner annular edge 38 (FIG. 2) defining a radial body portion 40 is positioned in the bearing assembly, with the outer peripheral edge 36 fitting into the groove 30 and the inner annular edge 38 fitting into the groove 32. Molded integral to the outer radial face 35 and extending axially outwardly therefrom is a resilient sealing extension or lip portion 41. The extension 41 extends axially outwardly in a direction generally divergent to the sealing ring 34 such as to form an acute angle 44 between the extension 41 and the outer face 35 of the radial body portion 40.

The radial body portion 40 of the annular sealing ring 34 extends across the lubricant holding space 28 of the bearing assembly 10. As can be seen in FIG. 2, the annular sealing ring 34 includes indentations 42 about the radial body portion 40 at the inner annular edge 38 of the radial face 35. These indentations 42 act as vents to permit a lubricant from the lubricant holding space 28 to escape around the inner annular edge 38 of the sealing ring 34 with the bearing being relubricated to prevent a build-up of pressure in the lubricant holding space 28. This type of lubricant vent is described more fully in U.S. Pat. No. 3,361,497 issued and assigned to the assignee of this application.

In operation, the first annular sealing ring 34 is positioned within grooves 30 and 32 with the inner annular edge 38 inserted with a close running fit into groove 32 in the inner racering 14 to maintain the sealing ring in position and to resist the axial displacement of the sealing ring by foreign material. The outer peripheral edge 36 is received in a close running fit within groove 30. The length of the resilient extension 41 is such that when the annular sealing ring 34 is positioned within the grooves, the extension 41 is resiliently compressed in an interference fit by the inner racering 14 at its point of contact at end 43.

A second annular sealing ring 45 of resilient nonmetallic material also has an outer peripheral edge 47 and an inner annular edge 49 which define a radial body portion 50. This ring is mounted in the bearing assembly by fitting the outer peripheral edge into the groove 30 in the outer racering 12 with the sealing ring 34. The inner annular edge 49 is positioned axially outwardly of the lubricant holding space 28 across the space between the bearing racerings and is seated in a running contact fit with the corner face 52 of the inner racering 14. It is contemplated by this invention that the groove 30 is of a predetermined width substantially equal to the thickness of the sealing rings 34 and 45. However, if the groove itself is of a thickness greater than the combination of the two annular sealing rings, a snap ring may be fitted into groove 30 to act to hold the outer peripheral edges of the annular sealing rings 34 and 45 within the groove.

Once more referring to FIG. 1, the radius of the outer peripheral edge of each of the sealing rings 34 and 45 is selected such that it is substantially equal to the radius to the bottom of groove 30 so that the outer peripheral edge of the rings 34 and 45 fit in a substantially line-to-line radial fit in the groove. The radial dimension of the body portion 40 is then chosen so the inner angular edge 38 of the ring 34 is in clearance radial fit in the groove 32. This insures that the inner and outer racerings are free to move relative to one another with the sealing rings providing minimal drag. It has been found that the compression of the extension or lip portion 41 onto the outer surface 48 of inner racering 14 produces an increased sealing effect without a substantial increased "drag" effect on the racerings.

The dimension of the radial body portion 50 of the second angular ring 45 is chosen so as to permit the ring to extend axially outwardly to make a running contact seal with the corner surface of the inner racering.

The sealing action of this invention is provided by the interference fit of the extension or lip portion 41 with the outer surface 48 of the inner racering 14, and the running contact seal between the first angular ring 34 and the walls of grooves 30 and 32 combined with the contact sealing action of sealing ring 45 with the corner face 52 of the inner racering.

The sealing ring 34 therefore makes a contact seal with the wall of groove 30 and a labyrinth-type seal in the groove 32. This sealing effect is substantially increased by the utilization of extension portion 41 in contact with the outer surface 48 of the inner member or racering 14. In addition to providing a running contact seal, the lip portion 41 also acts as a dam to retain lubricant in the void 53 between the ring 34 and the lip portion 41. The sealing ring 45 likewise makes a contact seal in the groove 30 and extends axially outwardly to make a running contact seal with the corner face 52 of the inner racering 14. In addition to providing a running contact seal, the ring 45 also acts as a dam to retain lubricant in the void 55 between the rings 34 and 45. This lubricant which, for example, could be grease then acts as an additional labyrinth seal which makes the multi-element seal even more effective.

During relubrication of the bearing in an operating installation, the lubricant is forced under pressure into the lubricating duct 26 where it enters the lubricant holding space 28. As the pressure mounts in the lubricant holding space 28 the grease vents around the bottom of the sealing ring 34 into the void space 53 between the ring 34 and the extension portion 41. The void space 53, therefore, provides a reservoir for retaining the lubricant between the ring 34 and the lip portion 41. As the pressure increases in void space 53, the extension 41 is lifted from its seat on the outer surface 48 of the inner member or racering 14 thereby permitting the lubricant to escape into void 55. As the pressure increases in the void 55, the sealing ring 45 is lifted from its seat on the corner face 52 permitting the lubricant to escape outside the bearing assembly thereby relieving the pressure in both the lubricant holding space 28 and the voids 53 and 55 to insure that the seals remain seated.

Figure 3:
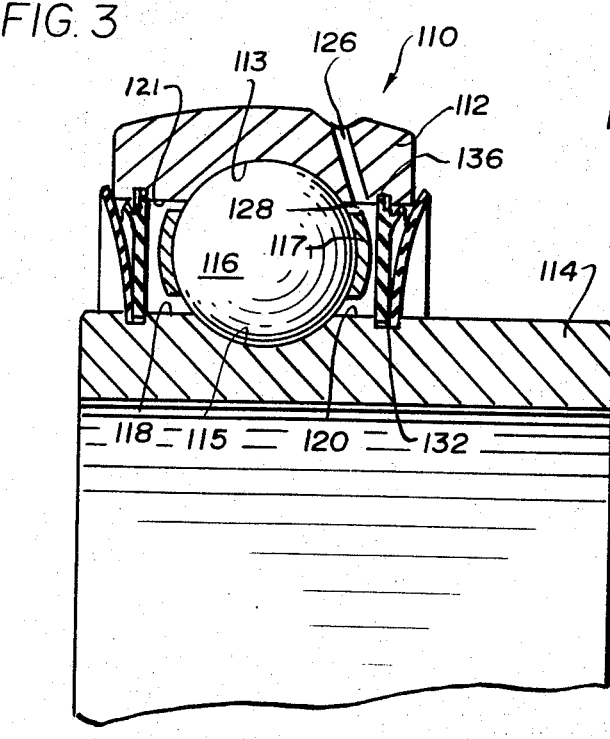
FIG. 3 is a cross-sectional view showing a further embodiment of the bearing assembly and seal structure.
Figure 4:
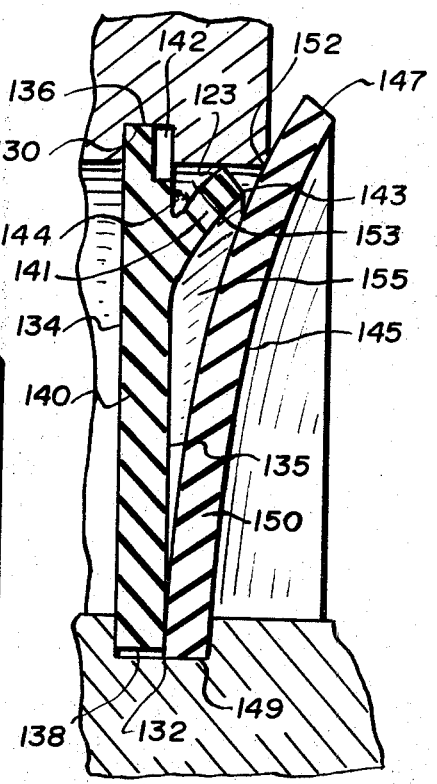
FIG. 4 is an expanded cross-sectional view of a portion of the seal structure of the bearing assembly of FIG. 3.

Again referring to the drawings, FIGS. 3 and 4 show a further embodiment of the seal structure wherein a bearing assembly 110 includes an outer member or racering 112 and inner member racering 114 which are rotatable relative to one another. The outer racering has a ball track 113 and the inner racering 114 has a ball track 115. The racerings 112 and 114 have a common axis and form a raceway in the bearing tracks 113 and 115 between the respective outer and inner faces thereof. A series of anti-friction members or balls 116 are positioned in the raceway by separator 117. Inner land portions 118 and 120 on the inner racering 114 and a corresponding outer land portions 121 and 123 on the outer ring 112 restrict the axial movement of the balls 116. A lubricating duct 126 is provided to introduce lubricant into the lubricant holding space 128 between the inner and outer racerings.

In this embodiment a first annular sealing ring 134 of a resilient nonmetallic material having an outer peripheral edge 136 and an inner annular edge 138 defining a radial body portion 140 is positioned in the bearing assembly with the outer peripheral edge 136 inserted with a close fit into the groove 130. The inner annular edge 138 is received in a close fit within groove 132. Molded integral with the outer radial face 135 and extending axially outwardly therefrom is a resilient sealing extension or lip portion 141. This extension 141 extends in a direction generally divergent to the sealing ring 134 such as to form an acute angle 144 between the extension 141 and the outer face 135 of the sealing ring 134 and provides a running interference fit with land portion 123. As can be seen in FIG. 4, the annular sealing ring 134 includes indentations 142 about the radial body portion 140 at the outer annular edge 136 of the radial face 135. These indentations 142 act as vents to permit a lubricant from the lubricant holding space 128 to escape around the outer annular edge 136 of the sealing ring 134 with the bearing being relubricated to prevent a build-up of pressure in the lubricant holding space 128.

A second annular sealing ring 145 of resilient nonmetallic material has an outer peripheral edge 147 and an inner annular edge 149 which defines a radial body portion 150. This ring is mounted in the bearing assembly by fitting the inner peripheral edge 149 into the groove 132 in the inner racering 114. The outer annular edge 147 is positioned axially outwardly of the lubricant holding space 128 across the space between the bearing racerings and is seated in a running contact fit with the corner face 152 of the outer racering 112. It is contemplated by this particular embodiment that the groove 132 is of a predetermined width greater than the thickness of sealing rings 134 and 145.

Referring to FIG. 4, annular sealing ring 134 casually contacts groove 130 of the outer racering 112 to form a labyrinth-type seal and the inner annular edge 138 of ring 134 casually contacts the groove 132 to form a labyrinth-type seal therewith and extension 141 at end 143 provides a running interference fit with land portion 123. During relubrication, as the pressure mounts in the lubricant holding space 128, the lubricant is forced around the top of the sealing ring 134 into the void space 153 between sealing ring 134 and sealing ring extension 141. As the pressure increases in void space 153, the extension 141 is lifted from its seat with land portion 123 thereby permitting the lubricant to escape into void 155. As the pressure increases in void space 155, the sealing ring 145 is displaced from corner face 152 to thereby relieve the pressure in both the lubricant holding space 128 and in void spaces 153 and 155.

What has been described, therefore, is a unique multi-element seal for a bearing assembly which does not interfere with the relative rotation of the movable parts of the bearing and which permits relubrication of the bearing assembly while in an operating installation. This relatively simple and inexpensive multiple contact seal extends bearing life by restricting contamination from foreign materials in the lubricant holding space and by permitting excess lubricant to escape from the lubricant holding space.

I claim:

1. A bearing seal for sealing a bearing assembly including outer and inner annular members which are rotatable relative to one another and which are spaced apart for receiving anti-friction elements and lubricant therebetween, said annular members having oppositely disposed grooves in each axial end thereof and at least one of said annular members having corner portions axially outwardly of the grooves, and a pair of annular sealing structures, one for each axial end of said members, each of said sealing structures including in combination, a first annular sealing ring comprising a radial body portion with an outer peripheral sealing portion extending radially outwardly therefrom and being positioned in the assembly to fit into a groove in said outer member and with an inner annular sealing portion extending radially inwardly therefrom and being positioned in the assembly to fit into a groove in said inner member, said first annular sealing ring further including a portion molded integral to said body portion and extending axially outwardly in an interference fit to provide a reservoir therebetween with the specified one annular member, and a second annular sealing ring comprising a radial body portion with an outer peripheral sealing portion extending radially outwardly therefrom and with an inner annular sealing portion extending radially inwardly therefrom, said second annular sealing ring being positioned in the assembly with one of said outer peripheral or inner annular sealing portions being positioned adjacent one of said outer peripheral and inner annular sealing portions of said first annular sealing ring positioned in the groove in the annular member opposite the specified one annular member, and the other of said outer peripheral and inner annular sealing portions extending axially outwardly from the assembly with said radial body portion extending across the space between the annular members to engage the corner portion of the specified one annular member in a running contact seal.

2. The bearing seal of claim 1 wherein said first annular sealing ring is positioned in the bearing assembly with said outer peripheral edge portion fitted into the annular groove in said outer member and said inner annular edge portion fitted into the annular groove in said inner member, and said integrally molded portion is an extension lip extending divergently axially outwardly from said radial body portion in an interference fit with the inner member.

3. The bearing seal of claim 1 wherein said first annular sealing ring is positioned in the bearing assembly with said outer peripheral edge portion fitted into the annular groove in said outer member and said inner annular edge portion fitted into the annular groove in said inner member, and said integrally molded portion is an extension lip extending divergently axially outwardly from said radial body portion in an interference fit with the outer member.

* * * * *